United States Patent
Behling et al.

(10) Patent No.: US 8,983,037 B2
(45) Date of Patent: Mar. 17, 2015

(54) BALANCING OF THE ROTARY ANODE OF AN X-RAY TUBE

(75) Inventors: Rolf Karl Otto Behling, Norderstedt (DE); Christoph Bathe, Hamburg (DE)

(73) Assignee: Koninklijke Philips N.V., Eindhoven (NL)

( * ) Notice: Subject to any disclaimer, the term of this patent is extended or adjusted under 35 U.S.C. 154(b) by 308 days.

(21) Appl. No.: 13/388,063

(22) PCT Filed: Sep. 8, 2010

(86) PCT No.: PCT/IB2010/054038
§ 371 (c)(1),
(2), (4) Date: Jan. 31, 2012

(87) PCT Pub. No.: WO2011/039662
PCT Pub. Date: Apr. 7, 2011

(65) Prior Publication Data
US 2013/0070903 A1 Mar. 21, 2013

(30) Foreign Application Priority Data
Sep. 30, 2009 (EP) .................................... 09171794

(51) Int. Cl.
*H01J 35/10* (2006.01)
*H01J 9/02* (2006.01)
*G01M 1/36* (2006.01)

(52) U.S. Cl.
CPC ............... *H01J 35/10* (2013.01); *G01M 1/365* (2013.01); *H01J 2235/1093* (2013.01)
USPC ............................................ 378/135; 445/51

(58) Field of Classification Search
CPC .......................... H01J 2235/1093; H01J 35/10
USPC ................................................... 378/121–142
See application file for complete search history.

(56) References Cited

U.S. PATENT DOCUMENTS

| | | | |
|---|---|---|---|
| 3,855,492 A | 12/1974 | Langer et al. | |
| 4,545,064 A * | 10/1985 | Klostermann | ............... 378/132 |
| 6,453,010 B1 | 9/2002 | Miller et al. | |
| 6,735,283 B2 | 5/2004 | Kutschera et al. | |
| 7,127,035 B2 * | 10/2006 | Anno et al. | ................... 378/133 |
| 7,286,643 B2 * | 10/2007 | Hebert et al. | ................. 378/125 |

FOREIGN PATENT DOCUMENTS

| | | |
|---|---|---|
| CN | 100487268 C | 5/2009 |
| DE | 1169686 B | 5/1964 |
| DE | 29723438 U1 | 6/1999 |

* cited by examiner

*Primary Examiner* — Hoon Song
*Assistant Examiner* — Danielle Fox

(57) ABSTRACT

An X-ray tube with a rotatable anode for generating X-rays and an X-ray apparatus and a method for balancing the rotary anode of an X-ray tube include balancing of the rotary anode applicable to an anode mounted inside an X-ray tube. The rotatable anode includes an anode disc fixedly mounted to a rotatably driven support body, which is rotatably supported by a bearing arrangement. The anode includes at least one balancing cavity to adjust the center of gravity of the anode. The balancing cavity is partly filled with a balancing material being solid at operating temperature of the X-ray tube and liquid at a higher temperature. The balancing method includes determining an imbalance of the anode; heating liquefy balancing material; dislocating the balancing material inside the balancing cavity to compensate the imbalance; and cooling to solidify the balancing material.

16 Claims, 11 Drawing Sheets

BALANCING OF THE ROTARY ANODE OF AN X-RAY TUBE

FIELD OF THE INVENTION

The invention relates to an X-ray tube with a rotatable anode for generating X-rays and an X-ray apparatus with such an X-ray tube and a method for balancing a rotary anode of an X-ray tube.

BACKGROUND OF THE INVENTION

X-ray tubes with a rotary anode are used in different X-ray systems, for example in a CT-system. For the generation of X-rays, the anode is rotated inside the tube. Prior to the assembly of the tube, a static balancing is achieved, for example, by cutting away materials from rotatable components. Although statically balanced, during operation thermo-mechanical and material ageing effects may cause a distortion of the state of balance of an X-ray tube's anode and, for example, the X-ray tube's rotor as well. In some cases this might go beyond acceptable levels so that the tube has to be replaced. Furthermore, as an example, in a CT-system, an X-ray tube is rotating about the patient and generates a fan beam of X-rays. Opposite and with it on a gantry rotates a detector system which converts the attenuated X-rays to electrical signals. Then, a computer system reconstructs an image of the patient's body in the region of interest. The imbalance of the anode may cause severe vibration of the tube housing assembly and thus malfunction of the detectors resulting in low image data quality. The imbalance may further cause reduction of bearing life and also an increase of acoustic noise. Usually, prior to mounting them into X-ray tubes, anode rotors will be assembled, then tested for vibration and balanced by drilling or cutting away material at the proper locations. After this, no further balancing is possible, as the rotors are enclosed in vacuum-tight tube frames.

SUMMARY OF THE INVENTION

Hence, there may be a need to provide a balancing of the rotary anode applicable to an anode mounted inside an X-ray tube.

According to an exemplary embodiment of the invention, an X-ray tube with a rotatable anode for generating X-rays is provided, wherein the anode comprises an anode disc fixably mounted to a rotatably driven support body, which support body is rotatably supported by a bearing arrangement. The anode comprises at least one balancing cavity to adjust the center of gravity of the anode which balancing cavity is partly filled with the balancing material being solid at operating temperature of the X-ray tube and liquid at a higher temperature.

One of the advantages is that the anode can be balanced by the influence of temperature affecting the state of the balancing material such that, for example, the anode can rest inside the tube in case of an already assembled tube. This further provides balancing of anodes in tubes which have already been used and where the imbalance, for example, is a result of such use. Thus, the actual usable life of the tubes with respect to an adequately balanced rotation is increased.

According to an exemplary embodiment, the X-ray tube comprises a cathode and a vessel enclosing the cathode and the anode. Further, a cooling arrangement may be provided to cool the anode disc during operation.

According to an exemplary embodiment, the balancing material is liquid at tube baking temperatures or when cooling is reduced and frozen, in other words solid, during operation with full cooling.

According to an exemplary embodiment, the material is in a solid state at a temperature below 150° C. and in a liquid state at a temperature above 150° C.

This provides the possibility to perform a balancing or rebalancing of the rotary anode at temperatures that can easily be handled and which consider normal operating conditions of X-ray tubes, for example in a CT-system.

According to an exemplary embodiment, the balancing material is a metal.

Metal has the advantage, among other advantages, that due to possible high relative densities, relatively small balancing cavities are necessary only, still providing efficient balancing effect.

According to an exemplary embodiment, various shapes of the balancing cavity are provided, particularly such that in order to achieve a good fine adjustment, for example, in case of a small initial imbalance, an adjustable fluid distribution is possible.

For example, possible shapes may be described by a triangular, rectangular or circular cross section, and/or by sub cavities or others, to minimize the manufacturing effort while optimizing a counter balancing. This is particularly beneficial in cases where the tube assembly cannot be positioned upwards, for example for rebalancing tubes in a CT-system.

According to an exemplary embodiment, the balancing cavity may be textured to improve fluid adhesion for the balancing material being in a liquid state due to heat application.

According to an exemplary embodiment, various material combinations for the material of the balancing liquid and the material out of which the balancing cavity is formed are provided, for example GaInSn & steel, InSn & steel, carbon, Mo, W, Cu.

According to an exemplary embodiment, a low vapour pressure of for example $10^{-4}$ Pa at elevated temperatures is preferred, for example at temperatures of approximately 300° C.

According to an exemplary embodiment for open balancing cavities, degassing channels are provided.

According to an exemplary embodiment, vacuum tight cavities are provided and the vapour pressure is not restricted, then.

According to an exemplary embodiment, a balancing element is provided comprising the at least one balancing cavity.

A separate balancing element has the advantage that the production of an anode disc or other elements of which the anode is assembled, needs not to be affected, because the separate element can be adapted such that it can be added to existing tube constructions. As a further advantage, the balancing element can be designed in order to consider its function and its manufacturing costs only without the necessity to consider other aspects as well as would be the case of an integrally formed cavity.

For example, the balancing element can also be referred to as a balancing unit.

According to an exemplary embodiment, the balancing element is attached or fixed to the anode.

According to a further exemplary embodiment, the balancing element comprises two or more balancing cavities. Additionally or as an alternative, two or more balancing elements may be provided.

According to an exemplary embodiment, the at least one balancing cavity is integrally formed with a rotatable part of the anode.

This provides the advantage, for example, that the balancing cavity may be formed during production of the anode or other rotating parts.

Further, for example, for sintering the anode, the cavity may temporarily be filled with removable material.

According to an exemplary embodiment, for at least two planes at least one balancing cavity is provided for each plane, for which plane an imbalance is detected, to adjust distributed imbalance.

This provides for a finer tuning or balancing of the tube and thus for a better re-balancing of the tube. Further, for example, in case of different bearing or support regions, the balancing can be adjusted to the requirements resulting from the different bearing situations.

According to an exemplary embodiment, at least one balancing cavity is provided for a multiple of planes, for which an imbalance is detected, to adjust a multiple of centres of gravity.

According to an exemplary embodiment, the support body comprises a rotor body and at least one balancing cavity is provided for each the plane of the rotor and the plane of the anode disc to adjust a rotor related center of gravity and an anode disc related center of gravity.

This provides for counterbalancing of the anode disc, for example, due to effects caused by the use of the tube, and to consider an imbalance occurring in the rotor body due to other effects which may also be caused by the use of the tube but which lead to a different dislocation of a center of gravity in the part of the rotor body. In other words, an even finer adjustment of the balancing of the anode can be provided.

According to an exemplary embodiment, the at least one balancing cavity is toroidal.

A toroidal, or circular or ring-shaped, cavity allows for a fine adjustment providing the possibility for adjustment in different directions which might be necessary over the life time of a tube.

According to an exemplary embodiment, the at least one balancing cavity comprises a number of independent sub-volumes. By, so to speak, dividing a balancing cavity in several independent or separate sub-volumes, an decreased effect on the constructional rigidity or stability, for example of an anode disc, can be achieved, thus resulting in a more durable construction of the rotating parts.

According to an exemplary embodiment, the anode is provided with a marker for phase definition for vibration measurement.

The phase definition for vibration measurement is, for example, possible by various means and markers, such as X-ray, magnetic, optical, mechanical, or by other means.

According to an exemplary embodiment, a coast-down curve is monitored in order to locate the imbalance with respect to the anode position during breaking of the anode for balancing purposes.

For example, the marker is the X-ray output of a slotted anode.

According to an exemplary embodiment, the vessel encloses a vacuum and the rotor body is driven by a stator mounted on the outside of the vessel.

Because the balancing is effected by temperature influence on a balancing material inside the cavity, balancing of the anode is also possible despite the vacuum. Hence, the balancing does not require a breakage of the vacuum and a sealing and evacuation following the balancing steps as would be the case for balancing an anode disc by chipping off parts of the anode disc.

According to an exemplary embodiment of the invention, an X-ray apparatus is provided with an X-ray tube according to one of the preceding described embodiments.

Further, according to an exemplary embodiment of the invention, a method for balancing a rotary anode of an X-ray tube is provided, comprising the following steps:

a) determining an imbalance of the anode;
b) heating up a balancing material which is arranged inside at least one balancing cavity, which balancing material is solid at operating temperature of the X-ray tube and liquid at a higher temperature, such that the balancing material becomes liquid;
c) dislocating at least a part of the balancing material inside the balancing cavity such that the imbalance of the tube is at least partially compensated; and
d) cooling the balancing material, such that the balancing material becomes solid.

For example, compensating the imbalance can also be referred to as counterbalancing.

The method according to the invention provides the advantage that an intervention in the sense of dismantling the tube is not necessary for the balancing because the balancing is based on using temperature influence on a balancing material inside the balancing cavity.

According to an exemplary embodiment, the imbalance is caused by a center of gravity being offset to the axis of rotation of the tube, and after compensation of the imbalance, the final center of gravity is positioned on the axis of rotation.

For example, the heating-cooling cycle can be repeated for fine adjustment of the counter balancing in a number of steps according to the required preciseness.

According to an exemplary embodiment, the step c) of dislocating the liquid balancing material is achieved by angulating the tube with respect to gravity such that a determined amount of imbalance is accounted for by the amount of material dislocated due to the force of gravity.

This provides a simple and reliable and also easily applicable step of dislocating or relocating the balancing material in order to achieve the correct amount of counter balancing effect.

According to an exemplary embodiment, the amount of initial imbalance is accounted for by angulation of the tube with respect to the horizontal plane (in respect to gravity) during the process of freezing. The fluid will then gather more or less concentrated at the bottom. The level of counter balancing can be adjusted to between zero, where the tube would be perpendicular, or maximal, where the tube would be horizontal.

According to an exemplary embodiment, the balancing material is at least partially magnetic and the dislocation is achieved by applying magnetic fields to the balancing material.

This provides a possibility to set the right amount of rebalancing effect without moving the tube itself.

According to an exemplary embodiment, magnetic forces are used in addition to the angulation of the tube, using material which reacts to magnetic fields in its liquid state.

According to an exemplary embodiment, the cooling is passive by letting the tube cool down on the normal conditions or room conditions.

According to an exemplary embodiment, the cooling is achieved actively by cooling the tube.

For example, a cooling arrangement is provided to cool the anode disc during operation and the cooling arrangement is used for actively cooling the balancing material.

According to an exemplary embodiment, the anode comprises an anode disc fixably mounted to a rotatably driven support body, which support body is rotatably supported by a bearing arrangement, and which support body comprises a rotor body; wherein the step a) of determining an imbalance of the anode, comprises determining a rotor related center of gravity and determining an anode disc related center of gravity; and wherein the steps b) of heating, c) of dislocating and d) of cooling the balancing material are consecutively exerted to a balancing material inside a balancing cavity allocated to the rotor and to a balancing material inside the balancing cavity allocated to the anode disc.

This provides the advantage that different imbalancing amounts can be accounted for, because of differently applicable rebalancing steps, with respect to the location of the imbalances and center of gravities.

According to an exemplary embodiment, the heating of the anode disc related balancing material is achieved by an electron beam from the cathode.

According to a further exemplary embodiment, the rotor is provided with a cooling arrangement cooling the rotor related cavity while the anode disc is heated.

According to an exemplary embodiment, during the heating, dislocating and cooling of the balancing material inside the balancing cavity allocated to the rotor, the entire tube is affected such that the balancing material inside the balancing cavity allocated to the anode disc is heated, dislocated and cooled, too.

For example, the tube is baked or operated with reduced or no cooling.

According to an exemplary embodiment, while the material is fluid or liquid, the imbalance in the anode is determined by measuring location and magnitude of the imbalance in two centers of gravity.

For example, this is performed at the evacuated tube at the tube assembly as a whole.

According to an exemplary embodiment, the rotor phase signal is taken from a marker, for example from the X-ray output of a slotted anode.

According to a further exemplary embodiment, the first step of balancing is done by baking the tube or operating it with reduced cooling in such a position that the rotor imbalance points upwards. For this, the entire tube is turned about its center axis, for example. In case of a rotor related cavity and a disc related cavity, the material in both balancing cavities will melt and gather each at the bottom. Upon cooling, the balancing material freezes in both cavities. For the second step of balancing, the tube is turned with the anode disc related imbalance pointing upwards. The anode stays at rest and is heated, for example with the electron beam. Appropriate temperature gradient within the anode is established such that the anode disc related balancing cavity gets hotter than the melting temperature of a balancing fluid, while the rotor related cavity still stays cooler. So, just the liquid material in the anode disc related cavity will re-gather at the bottom. Upon cooling, the liquid material freezes again and becomes solid.

In a further exemplary embodiment, the tube is heated under rotation and then cooled off, still under rotation. In a further step, the vibration and its phase of the unbalanced anode are measured. Then the rotation is stopped, while the cooling is still turned on, and rotated or turned such that the center of gravity (COG) is pointing upward. According to the measured amount of imbalance, the tube is angulated. Therefore, the rotating axis of the tube is tilted or pitched such that the axis is inclined with respect to the horizontal plane. In other words, the rotating axis is pivoted around a horizontal line. Next, the rotatable body comprising the balancing cavity is heated while cooling is off, such that the balancing material melts and flows inside the cavity due to gravity forces. This leads to balancing or rebalancing the anode such that the center of gravity lies on the axis of rotation. After cooling the balancing material below its melting point, i.e. once the balancing material has become solid and is thus in place, the tube is ready for operation. Since during normal operation, the temperature stays below the critical value or threshold when the balancing material would become liquid, the balancing of the tube is achieved throughout further operation of the tube, of course, until next re-balancing is required and performed as described above.

According to an exemplary embodiment, for example in case of counterbalancing in only one plane, where only a single balancing cavity needs to be filled in the correct way, the turning of the tube or even whole tube assembly about its main axis may be replaced by an automatic trial and error procedure. Multiple landings of the bearing, that is to say start-brake procedures, are initiated until the anode rest position is by chance with the imbalance pointing upwards. Despite being more time consuming, this simplified procedure is particularly useful on site.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfil the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

However, the computer program may also be presented over a network like the World Wide Web and can be down loaded into the working memory of a data processor from such a network. According to a further exemplary embodiment of the present invention, a medium for making a computer program element available for down loading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

BRIEF DESCRIPTION OF THE DRAWINGS

The aspect defined above and further aspects, features and advantages of the present invention can also be derived from the examples of embodiments to be described herein after and are explained with reference to examples of embodiments, but to which the invention is not limited. The invention will be described in more detail hereinafter with reference to the drawings.

DETAILED DESCRIPTION OF EMBODIMENTS

Figure 1:
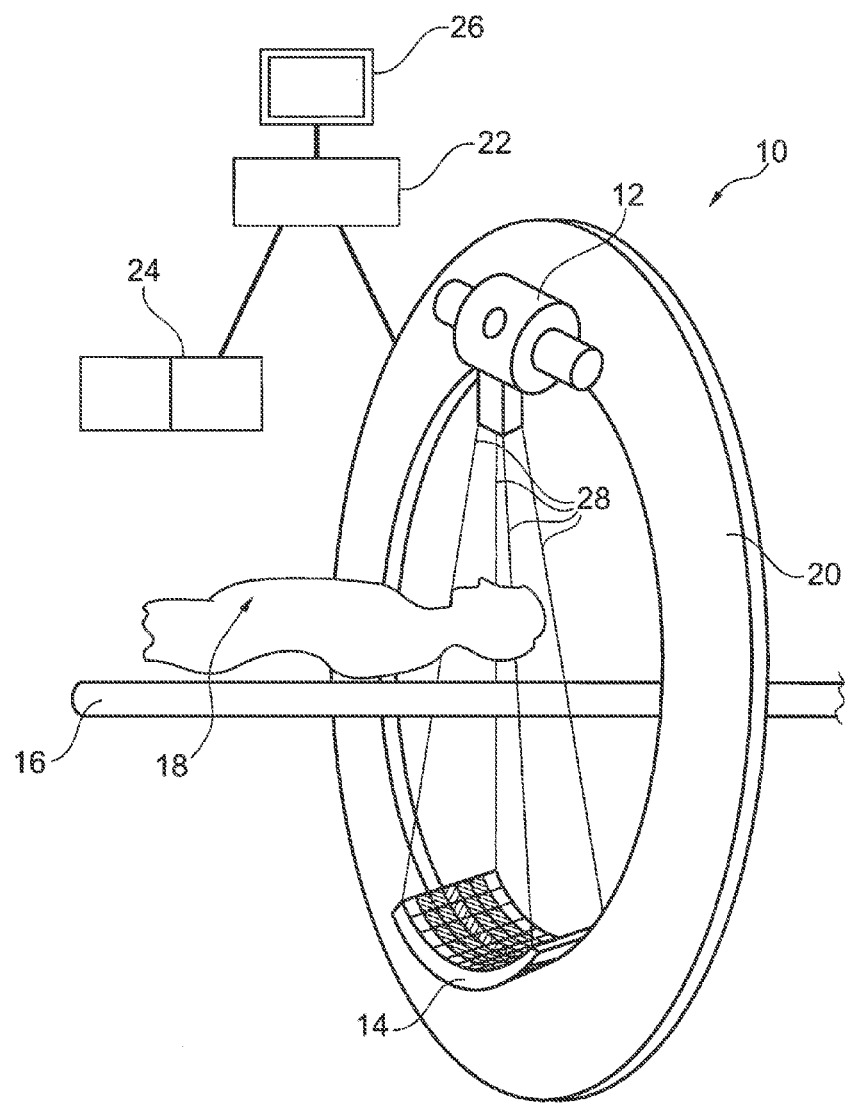
FIG. 1 schematically shows an X-ray apparatus in form of a CT-system with an X-ray tube according to the invention.

FIG. 1 schematically shows an X-ray apparatus 10 with an X-ray tube 12 as a source of X-ray radiation. The X-ray apparatus further comprises a detector module 14 and a device 16 for receiving an object of interest, such as a patient 18. The examination table 16 is arranged between the source of X-ray radiation with the X-ray tube 12 and the detector module 14. As an example only, the X-ray tube 12 is shown for a CT-system comprising a gantry 20 which is used for rotating the source of X-ray radiation and the detector 14 around the object of interest. Further, a processor unit 22 is provided connected to the detector module and the source of X-ray radiation. The processor unit 22 is further provided with an interface 24 to allow for an input of commands or other data by the user, for example. Further, a display unit 26 is provided connected to the processor unit 22 to display information such as X-ray images, to the user.

The source of X-ray radiation generates a fan beam of X-rays, indicated by lines 28, thus providing information about a patient's body in a region of interest.

Figure 2:
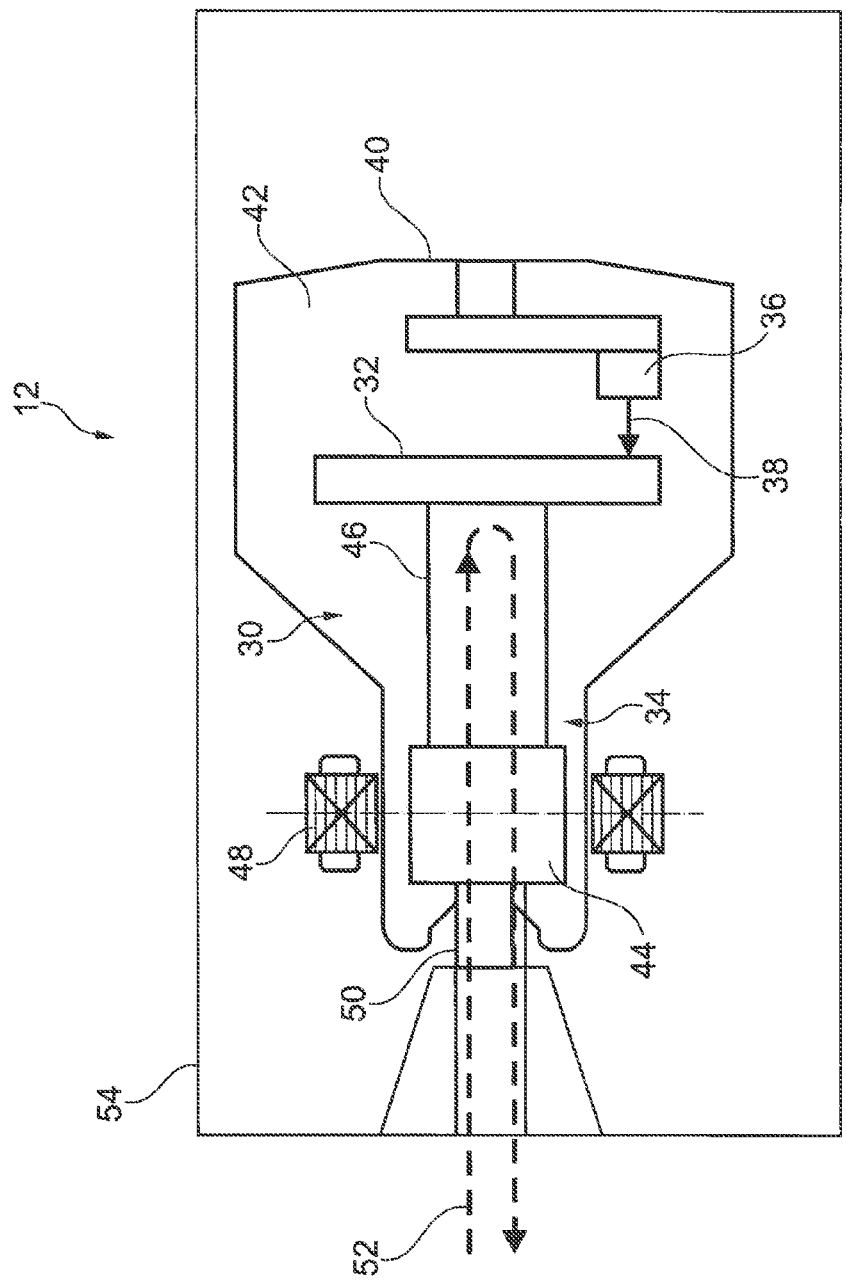
FIG. 2 schematically shows an X-ray tube with a rotating anode.

An X-ray tube 12 comprises a rotatable anode 30 which shall be described in more detail with reference to FIG. 2. The anode 30 comprises an anode disc 32 fixedly mounted to a rotatably driven support body 34 which support body is rotatably supported by a bearing arrangement not further shown. Further, a cathode 36 is provided to which high current is supplied to in order to generate an electron beam impinging on the surface of the anode disc, indicated by arrow 38. The cathode 36 and the anode 30 are arranged inside a vessel 40 enclosing a vacuum 42. The support body 34 comprises a rotor body 44 provided with a stem 46 supporting the anode disc 32. The rotor body is driven by a stator 48 mounted to the envelope 40. The stator 48 exerts an electro-magnetic force to the rotor body 44 thus rotatably driving the anode 30.

Further, an anode support shaft 50 is provided enabling the entry of a cooling fluid, indicated by stripped line 52 to enter the inside of the envelope 40, respectively flowing in a cooling channel provided inside the rotor body 44 and the stem 46. However, the cooling fluid 52 provides a cooling of the anode assembly inside the envelope 40. Further, a tube housing 54 is provided enclosing the envelope 40, wherein the tube housing comprising insulating oil surrounding the envelope 40.

Because of the rotation of the anode 30, balancing is an important aspect for the operation of the X-ray tube 12. Static balancing is done prior to assembly of the tube 12 by cutting away material from rotatable components, for example. However, due to operation procedures, the state of balance is usually distorted due to thermo-mechanical and material-ageing effects. It may occur that such an imbalancing goes beyond acceptable levels. The imbalance of the anode may then cause severe vibration of the tube housing 54, i.e. the tube assembly 12 as a whole also, and in turn a malfunction of the detector 14 due to the vibration. Further, the imbalance of the anode has a severe effect by reducing the bearing life of the bearing assembly 34 and also increase of acoustic noise, thus effecting both user and patient 18. However, as a result, such a tube would have to be replaced.

According to the invention, the anode 30 comprises at least one balancing cavity to adjust the center of gravity of the anode, which balancing cavity is partly filled with the material being solid at operating temperature of the X-ray tube and a liquid at a higher temperature. It is noted that the balancing cavity and the balancing material is not further shown in FIG. 2, but will be described in more detail below.

Figure 3:
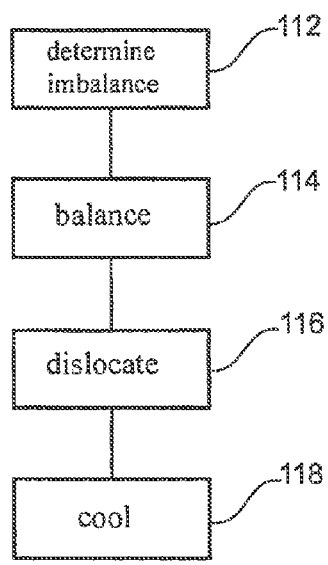
FIG. 3 schematically shows steps of a method for balancing the rotary anode of an X-ray tube.

First, the method steps for balancing a rotary anode of the X-ray tube 12 is described with reference to FIG. 3. In a first step 112, the imbalance of the anode 30 is determined. Next, a balancing material which is arranged inside at least one balancing cavity is heated up 114. The balancing material is solid at operating temperature of the X-ray tube and liquid at a higher temperature. Hence, the heating-up is performed such that the balancing material becomes liquid. After heating up the material, at least a part of the balancing material inside the balancing cavity is dislocated 116 such that the imbalance of the anode 30 is at least partially compensated. Then, the balancing material is cooled 118 such that the balancing material becomes solid.

Figure 4:
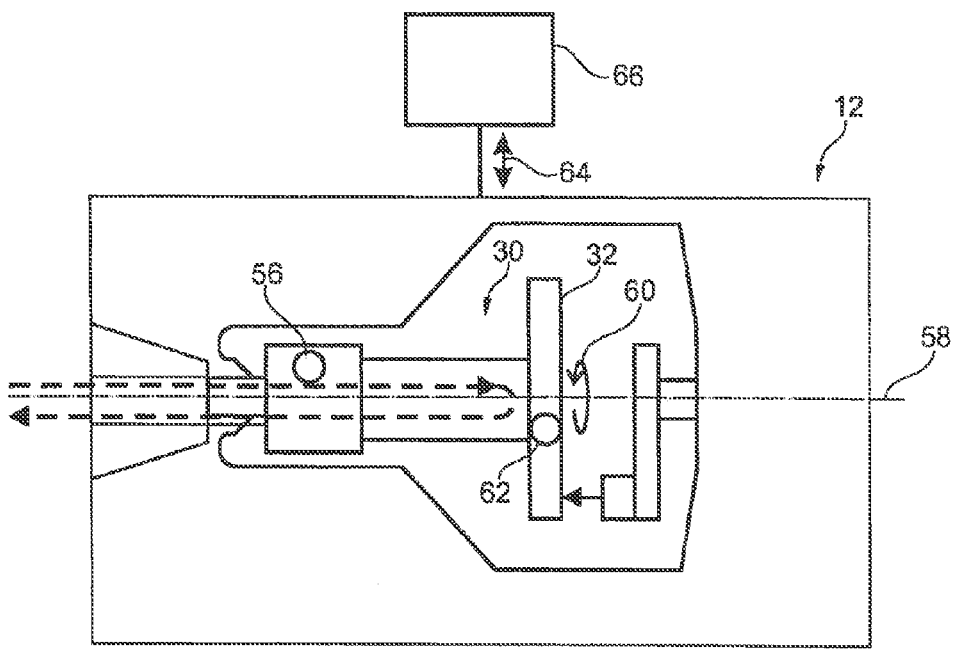
FIG. 4 schematically shows a set-up for measuring the imbalance of an anode.

In FIG. 4, an example of the tube 12 is shown where a first center of gravity 56 related to the stator is shown offset to an axis of rotation 58 of the anode 30. The rotation of the anode is indicated also by arrow 60. Further, a second center of gravity 62 related to the anode disc 32 is also shown offset to the axis of rotation 58. But it must be noted that the two centres of gravities 56 and 62 are offset in different directions in relation to the axis of rotation 58. The resulting imbalance, indicated by arrow 64, can be measured by applying a vibration probe 66, not further shown or described in detail.

Figure 5:
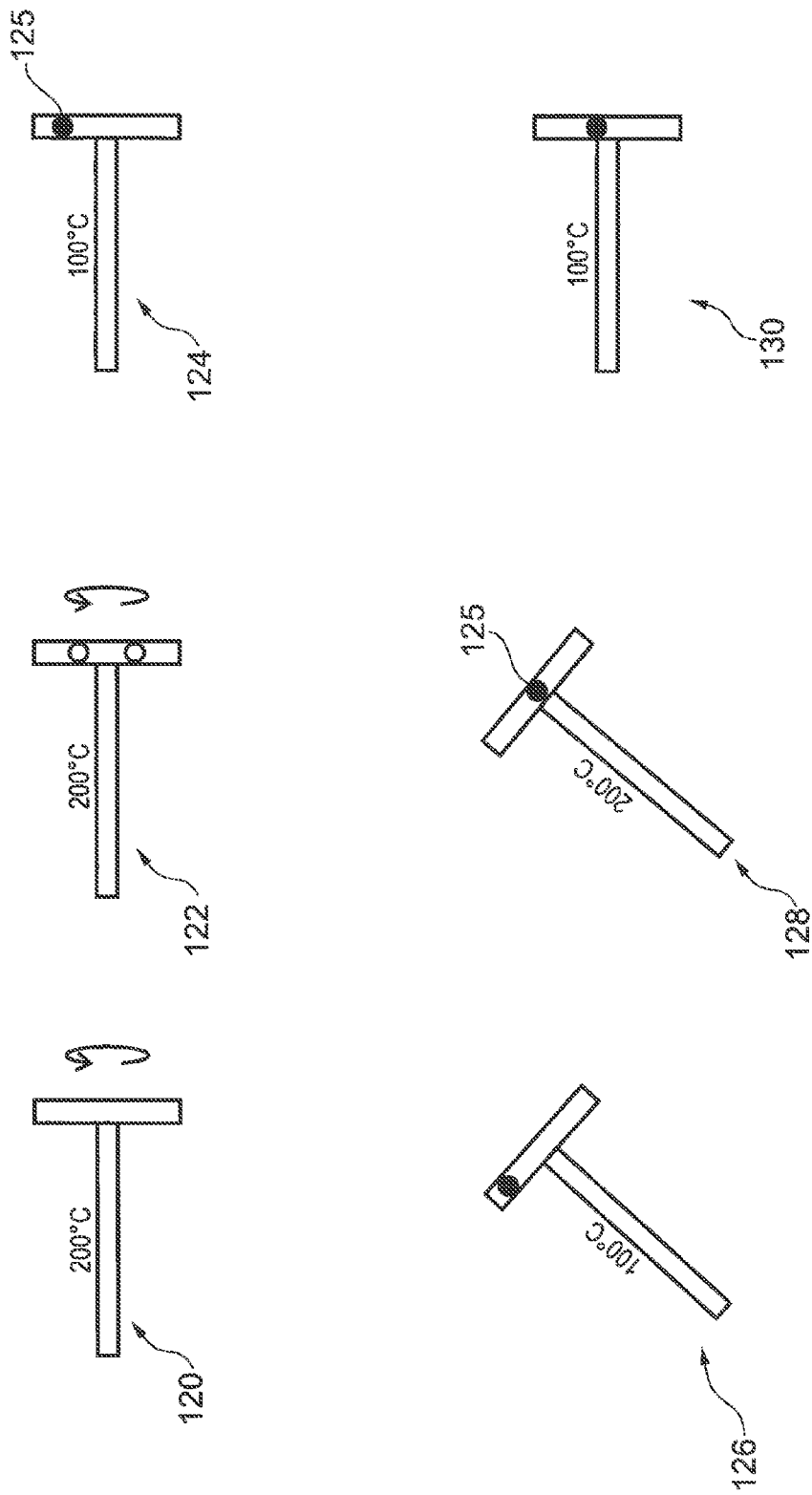
FIG. 5 schematically shows a rebalancing procedure according to the invention.

FIG. 5 shows an exemplary embodiment of method steps of a rebalancing procedure. It is noted that any balancing cavities or other details are not depicted for reasons of simplicity. In a first step 120, an imbalanced anode is heated under rotation, which for example can be achieved by heating the anode with switching-off a cooling as shown in FIG. 2. In a second step 122, the vibration and its phase of the unbalanced anode is measured. Next, in step 124, the rotation is stopped and the cooling is turned on, thus cooling the anode. The tube is turned such that the center of gravity is pointing upward, indicated by black dot 125.

According to the measured imbalance, in a further step 126, the tube is angulated or tilted such that the axis of rotation is pivoted around a horizontal line which can easily be understood by the respective pictogram in FIG. 5. In a next step 128, the rotatably body or anode 230 is heated, of course while the cooling is switched off. This provides that the balancing material becomes liquid and, due to gravity, the balancing material is dislocated inside the not further shown balancing cavity such that the center of gravity 125 is relocated and now positioned on the axis of rotation. Next, the anode is cooled by switching on cooling, for example, such that the balancing material becomes solid and stays in place and the tube can be moved to its original position in the final step 130 providing a tube ready for operation but being balanced.

Figure 6:
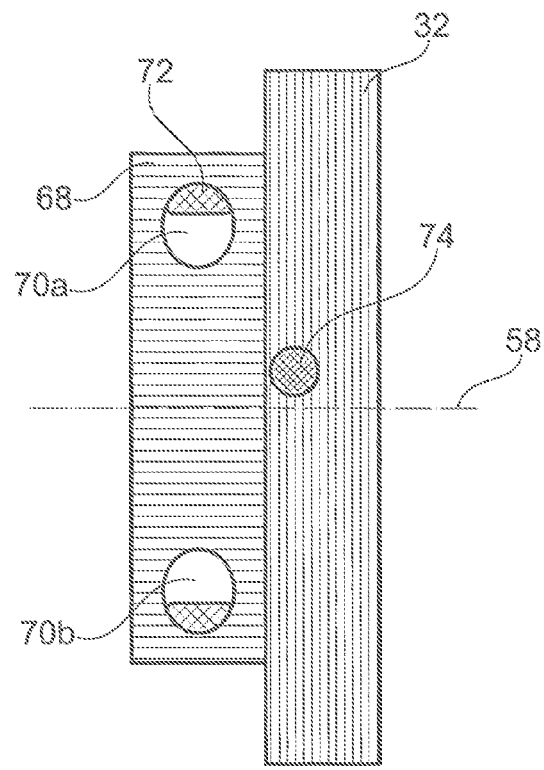
FIG. 6 schematically shows an anode disc with an attached balancing element.

As an exemplary embodiment, FIG. 6 schematically shows the anode disc 32 of the tube 12 and a balancing element 68 being attached or otherwise fixed to the anode 32. The balancing element comprises at least one balancing cavity 70. The balancing cavity 70 is toroidal or in other words ring shaped. Because FIG. 6 shows a section through the anode disc 32 which is of round or circular shape, the cavity 70 is shown with two recesses inside the balancing element 68, indicated by circular openings 70a and 70b.

The balancing cavity 70 is partly filled with a balancing material 72. The balancing material is solid at operating temperature of the X-ray tube 12 and liquid at a higher temperature. For example, the material 72 is in a solid state at a temperature below 150° and in a liquid state at a temperature above 150° C., for example at 200° C. Further, in FIG. 2 the anode disc 32 is shown with an initial center of gravity 74 offset from the axis of rotation 58.

Figure 7:
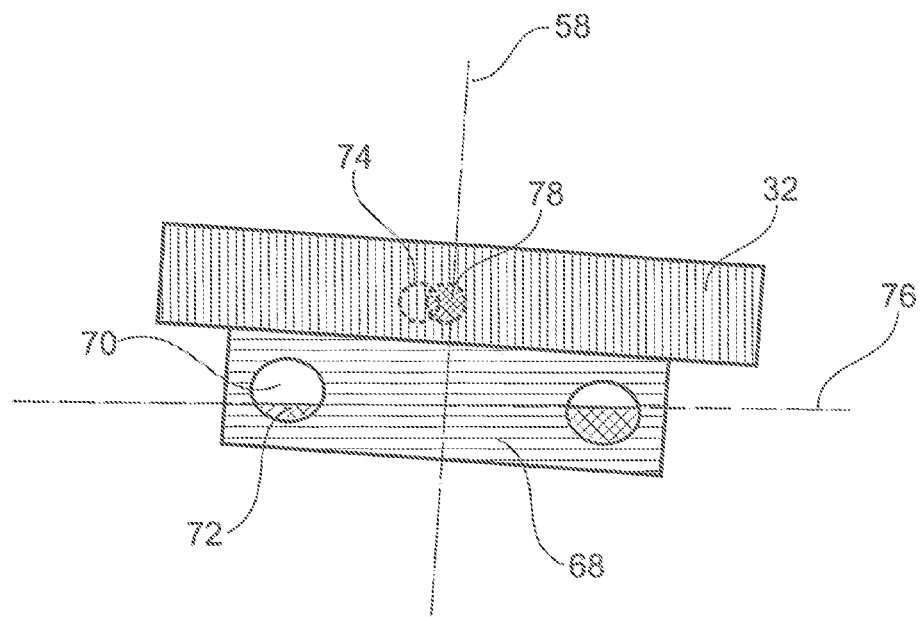
FIG. 7 shows the anode disc of FIG. 6 during the dislocation of at least a part of the balancing material.

In order to rebalance or to relocate the center of gravity to be positioned on the axis of rotation 58, the balancing material 72 inside the balancing cavity is brought into a liquid state by applying thermal energy to the balancing material 72. For rebalancing, the anode disc 32, together with the attached balancing element 68 is brought into an angulated state according to the amount of imbalance measured beforehand. This is shown in FIG. 7 where a second dotted line 76 indicates the horizontal plane. Once the balancing material 72 reaches a liquid state, it will flow inside the annular shaped balancing cavity 70 according to the forces due to gravity. Once the balancing material 72 is liquid, it will flow such that its surface will more or less be according to the horizontal plane, as can be seen by comparing the two portions of the cavity 70 shown in the section in FIG. 7.

By dislocating the balancing material, the initial center of gravity 74 is moved or shifted such that a final center of gravity 78 is more or less positioned on the axis of rotation 58.

Although the balancing procedure has been described with relation to one cavity only in the preceding description, according to the invention it is provided that the imbalance is determined for a rotor related center of gravity and an anode disc related center of gravity, as already indicated in relation with FIG. 4.

Figure 8:
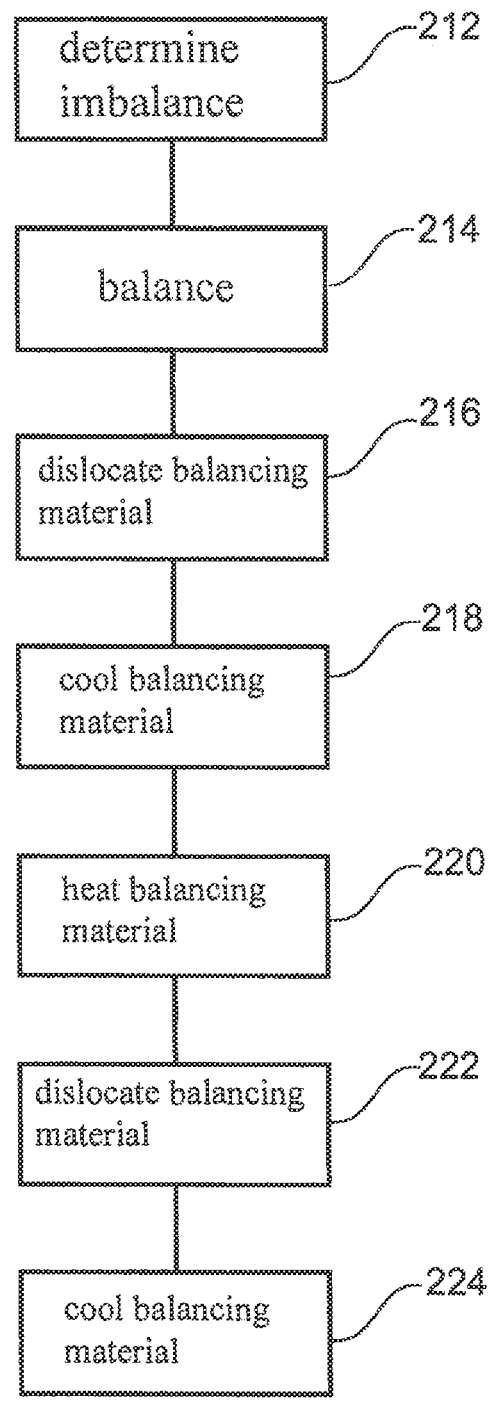
FIG. 8 shows method steps of an embodiment of the method of FIG. 3.

According to an exemplary embodiment, such a method considering two different centres of gravity and their imbalance will be described with reference to FIG. 8. In a first step 212, the determination of an imbalance of the anode 30 comprises determining a rotor related center of gravity and determining an anode disc related center of gravity. In a further step 214, a balancing material inside a balancing cavity allocated to the rotor is heated, dislocated 216, and cooled 218 as has been basically described with reference to FIG. 3. In the further set of steps, a heating step 220, a dislocating step 222 and a cooling step 224 is exerted to a balancing material inside a balancing cavity allocated to the anode disc.

Thus, a balancing or rebalancing of an anode is provided considering two different offsets for centres of gravity within the anode construction.

Figure 9:
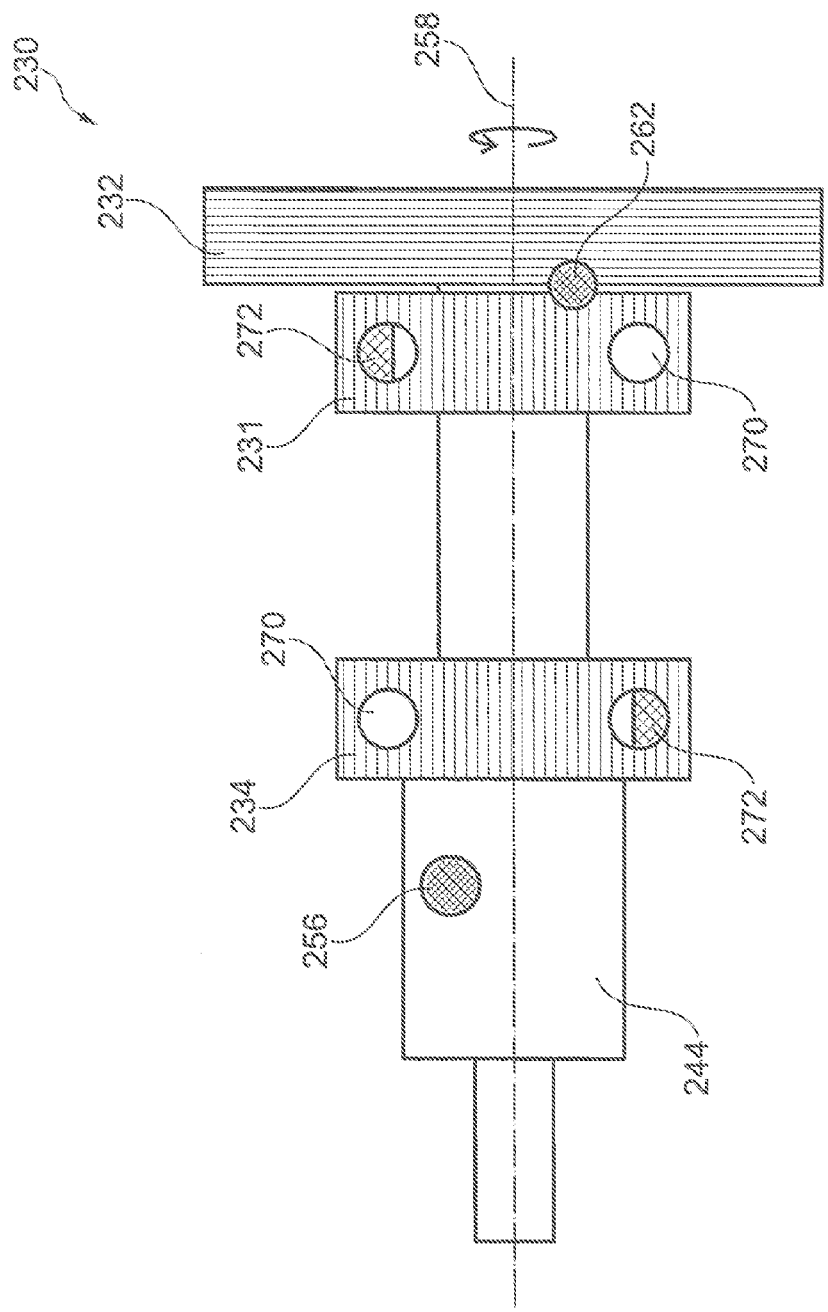
FIG. 9 schematically shows an anode in an imbalanced state.

In FIG. 9, an anode 230 is shown with a first balancing element 231 attached to the anode disc 232. A second balancing element 234 is shown allocated to the rotor 244. Both, the first and second balancing element 231 and 234 are each provided with a toroidal balancing cavity 270. The balancing cavities 270 are filled with balancing material 272 each. Further, a first center of gravity 256 related to the rotor and a second center of gravity 262 related to the anode disc are identified. Both centres of gravity 256 and 262 are offset from the axis of rotation 258, thus leading to imbalance of the anode.

Figure 10:
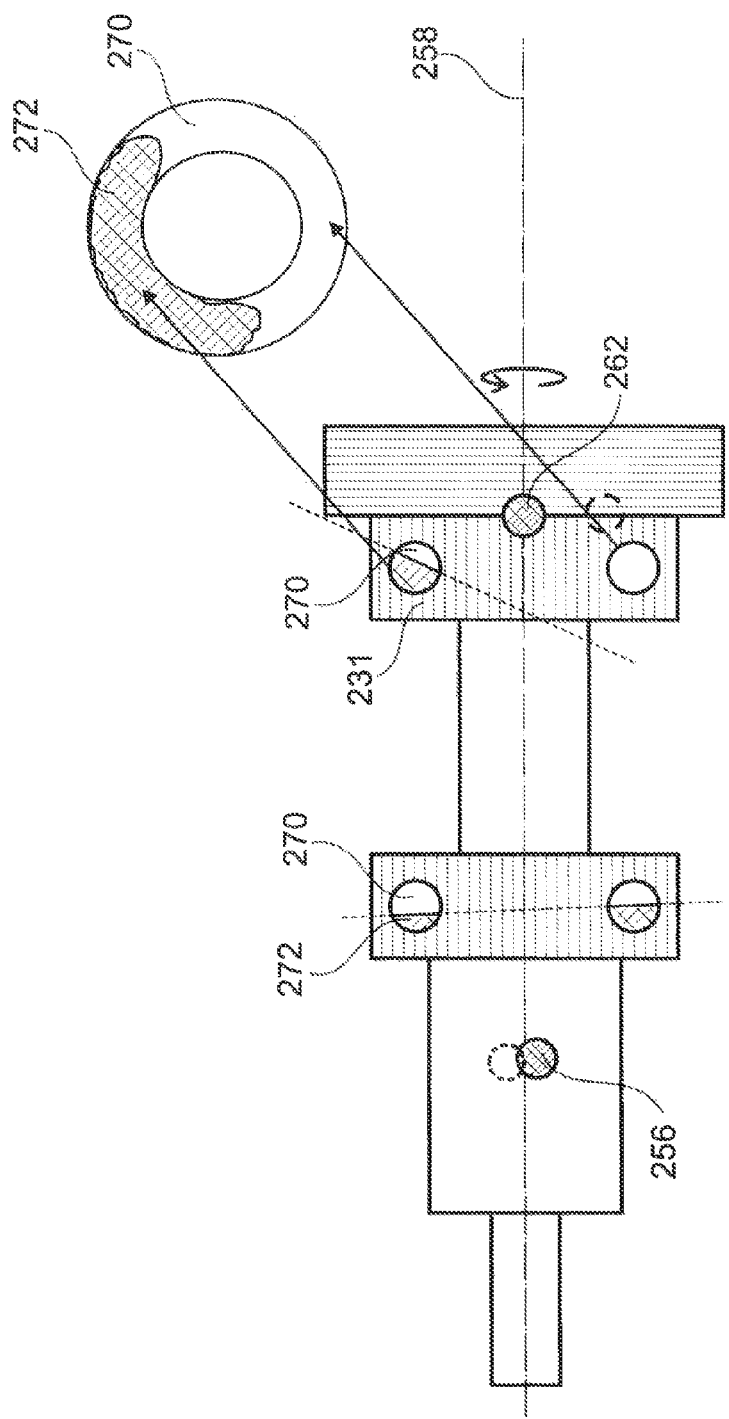
FIG. 10 schematically shows the anode of FIG. 9 in a balanced state.

In order to reposition the centres of gravity, the material 272 inside the balancing cavities 270 is dislocated by heating the material in order to bring the material to its liquid state. Then the material can be dislocated inside the cavities 270. The result of the dislocation of the material is shown in FIG. 10 where for example only, the cavity 270 of the disc related balancing element 231 is shown in its ring-shaped form. As can be seen in FIG. 10, the material 272 inside the cavity 270 is arranged in a filling pattern such that the dislocation of the balancing material leads to a position of the center of gravity 262 on the axis of rotation 258. The same applies to the repositioning of the center of gravity 256 related to the rotor. It is noted that the former position of these two centres of gravity 256 and 262 are indicated by a dotted line each, for a better understanding.

Figure 11:
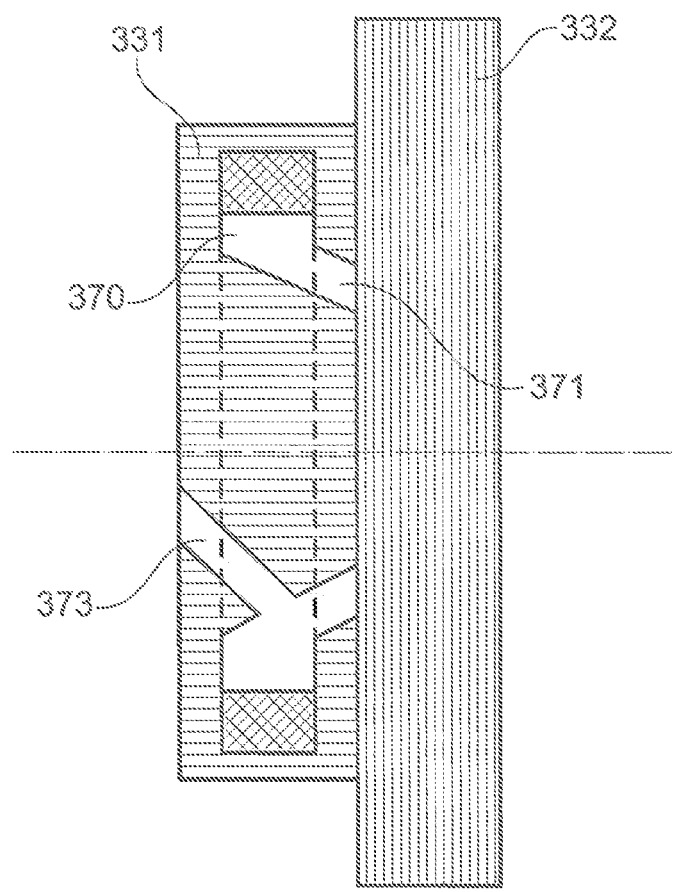
FIG. 11 schematically shows a further embodiment of an anode with a separate balancing element.

A further embodiment of a balancing element is shown in FIG. 11 with a different cross section and shape of the balancing cavity. The balancing cavity 370 is provided in an open manner within the balancing element 331 attached to the anode disc 332. The balancing cavity 370 is closed by mounting the balancing element 331 to the anode disc 332. Of course, the same would be possible by mounting the element to the rotor body or also a bearing stem or the like. The balancing cavity 370 is provided with a reduced radius R indicated by reference number 371 for reduced hydro-dynamic pressure to prevent the fluid inside the cavity from leaking. Further, a degassing channel 373 is provided to allow degassing in case of vapour pressure differences at elevated temperatures.

Figure 12:
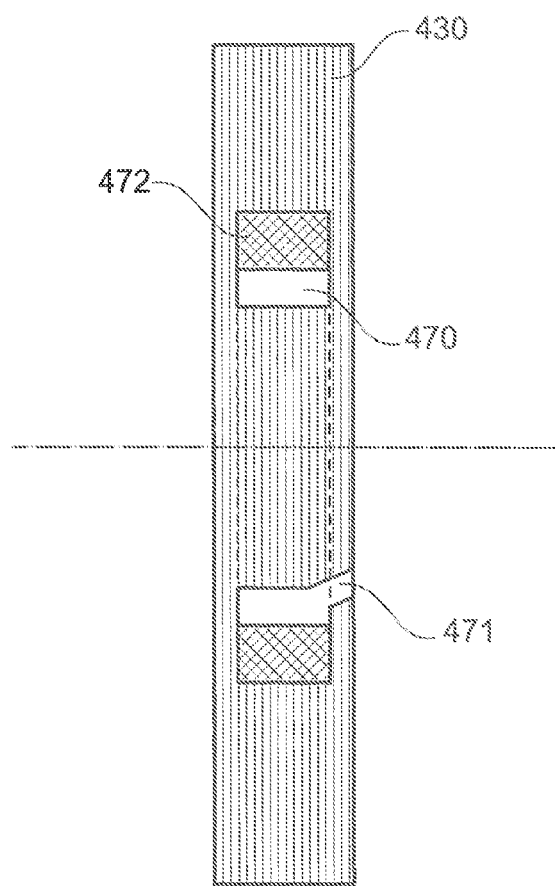
FIG. 12 schematically shows an embodiment of integrated balancing cavities in an anode.

FIG. 12 shows an embodiment of an integrated balancing cavity, or in other words with an integrally formed balancing cavity 470 provided inside a rotatable body 430, such as an anode disc or a bearing stem or a rotor body. The cross section of the balancing cavity 470 is having a square or rectangular form but could also be provided as having a circular cross-section. The balancing cavity 470 is partially filled with a balancing material 472. The balancing cavity 470 is formed for example during the production of the anode or other parts. For centering, the cavity 470 may temporarily be filled with removable material.

To allow vapour pressure to exhaust, a degassing channel 171 is provided.

Figure 14:
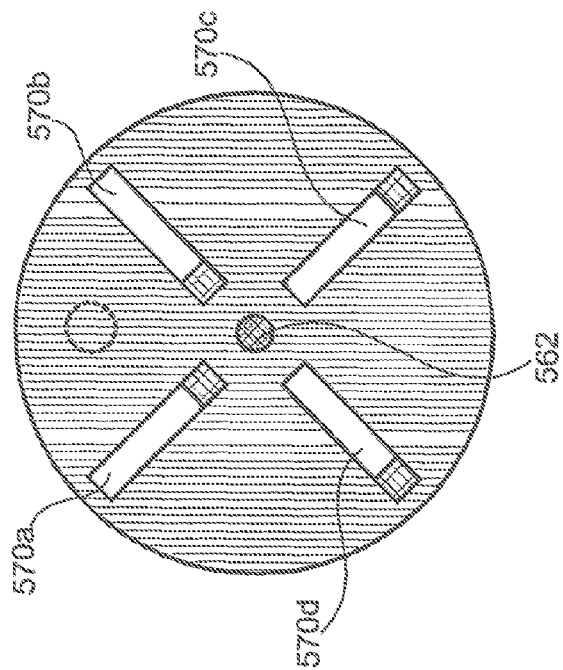
FIG. 14 shows the balancing cavity of FIG. 13 in a balanced state.
Figure 13:
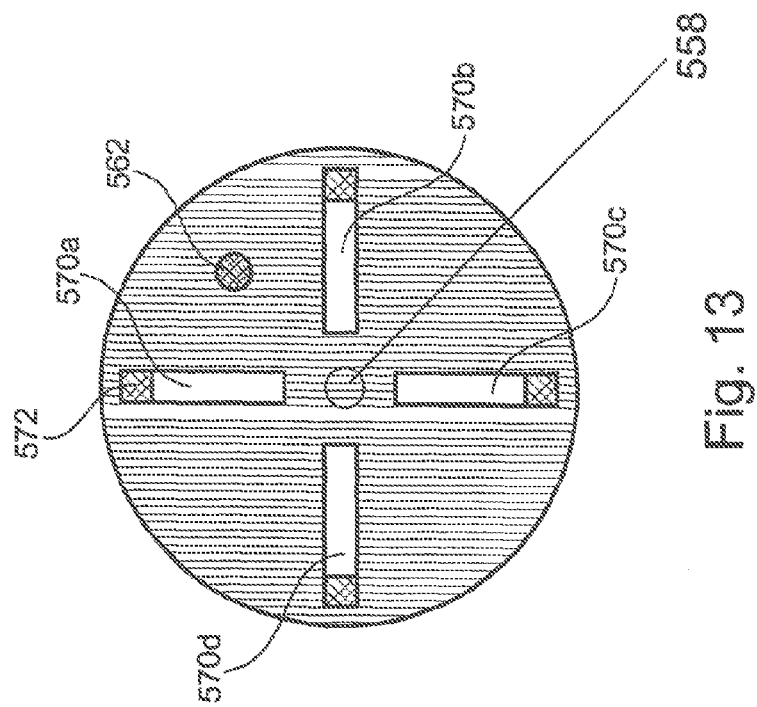
FIG. 13 shows an embodiment of a balancing cavity comprising independent sub-volumes in an unbalanced state.

According to an exemplary embodiment, shown in FIGS. 13 and 14, a balancing cavity 570 is provided comprising a number of independent sub-volumes 570a, 570b, 570c and 570d. Each of the sub-volumes is partly filled with balancing material 572. In FIG. 13, a center of gravity 562 is indicated being offset from the axis of rotation 558. For balancing, the material 572 inside the sub-volumes of the balancing cavity are dislocated, shown in FIG. 14, thus resulting in the center of gravity 562 being positioned such to be on the axis of rotation 558. The dislocation of the center of gravity is indicated by also showing the former position of the center of gravity with a dashed circle.

In addition to the cavities shown, it is possible that the shapes of the cavity may be described by a triangular, rectangular or circular cross section. Of course, other forms of sub cavities are possible, for example to minimize the manufacturing effort while optimizing the counter balancing. Further, the balancing cavity may be textured to improve fluid adhesion.

Although not further shown in the figures, various material combinations for the material of the balancing liquid and the material out of which the balancing cavity is formed, are provided, for example GaInSn & steel, InSn & steel, carbon, Mo, W, Cu.

According to the invention, the balancing element may comprise two or more balancing cavities. Further, it is possible to apply two or more balancing elements to an anode which is not further shown in detail.

The anode is provided with a marker for phase definition for vibration measurement (not shown).

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage.

A computer program may be stored and/or distributed on a suitable medium, such as an optical storage medium or a solid state medium supplied together with or as part of other hardware, but may also be distributed in other forms, such as via the internet or other wired or wireless telecommunication systems.

Any reference signs in the claims should not be construed as limiting the scope.

The invention claimed is:

1. An X-ray tube having a rotatable anode for generating X-rays, wherein the rotatable anode comprises:
   a rotatably driven support body;
   an anode disc fixedly mounted to the rotatably driven support body; and
   a bearing arrangement, the support body being rotatably supported by the bearing arrangement,
   wherein the rotatable anode has at least one balancing cavity to adjust a center of gravity of the rotatable anode,
   wherein the balancing cavity is partly filled with a balancing material being solid at an operating temperature of the X-ray tube and liquid at a higher temperature higher than the operating temperature.

2. The X-ray tube according to claim 1, wherein the rotatable anode further comprises a balancing element, and wherein the balancing element includes the balancing cavity.

3. The X-ray tube according to claim 1, wherein the at least one balancing cavity is integrally formed with a rotatable part of the rotatable anode.

4. The X-ray tube according to claim 1, wherein for at least two planes at least one balancing cavity is provided for each plane for detecting and adjusting an imbalance.

5. The X-ray tube according to claim 4, wherein at least one balancing cavity is provided for a plurality of planes for detecting an imbalance and adjusting a plurality of centers of gravity.

6. The X-ray tube according to claim 4, wherein the support body comprises a rotor, and wherein at least one balancing cavity is provided for a plane of the rotor and a plane of the anode disc to adjust a rotor related center of gravity and an anode disc related center of gravity.

7. The X-ray tube according to claim 1, wherein the at least one balancing cavity is toroidal.

8. The X-ray tube according to claim 1, wherein the at least one balancing cavity comprises a number of independent sub-volumes.

9. The X-ray tube according to claim 1, wherein the rotatable anode has a marker for phase definition for vibration measurement.

10. The X-ray tube of claim 1, wherein at least one of the X-ray tube and the rotatable anode is moved to determine the center of gravity of the rotatable anode, and to dislocate at least a part of the balancing material inside the at least one balancing cavity when the at least a part of the balancing material is liquid due to heating of the at least a part of the balancing material.

11. An X-ray apparatus with an X-ray tube having a rotatable anode for generating X-rays, wherein the rotatable anode comprises:
   rotatably driven support body;
   an anode disc fixedly mounted to the rotatably driven support body; and
   a bearing arrangement, the support body being rotatably supported by the bearing arrangement,
   wherein the rotatable anode has at least one balancing cavity to adjust a center of gravity of the rotatable anode,
   wherein the balancing cavity is partly filled with a balancing material being solid at an operating temperature of the X-ray tube and liquid at a higher temperature higher than the operating temperature.

12. A method for balancing a rotary anode of an X-ray tube, comprising acts of:
   determining an imbalance of the rotary anode;
   heating up a balancing material which is arranged inside at least one balancing cavity, which balancing material being solid at an operating temperature of the X-ray tube and liquid at a higher temperature higher than the operating temperature, such that the balancing material becomes liquid;
   dislocating at least a part of the balancing material inside the balancing cavity such that the imbalance of the rotary anode is at least partially compensated; and cooling the balancing material, such that the balancing material becomes solid.

13. The method according to claim 12, wherein the dislocating act is achieved by angulating the X-ray tube with respect to gravity such that a determined amount of imbalance is accounted for by an amount of material dislocated due to gravity.

14. The method according to claim 12, wherein the rotary anode comprises an anode disc fixedly mounted to a rotatably driven support body, the support body being rotatably supported by a bearing arrangement, and the support body comprises a rotor;
   wherein the determining act comprises determining a rotor related center of gravity and determining an anode disc related center of gravity; and
   wherein the acts of heating, dislocating and cooling are consecutively exerted to a balancing material inside a balancing cavity allocated to the rotor and to a balancing material inside a balancing cavity allocated to the anode disc.

15. The X-ray apparatus of claim 11, wherein at least one of the X-ray tube and the rotatable anode is moved to determine the center of gravity of the rotatable anode, and to dislocate at least a part of the balancing material inside the at least one balancing cavity when the at least a part of the balancing material is liquid due to heating of the at least a part of the balancing material.

16. A non-transitory computer readable medium comprising computer instructions which, when executed by a processor, configure the processor to perform acts of:
   determining an imbalance of the rotary anode;
   heating up a balancing material arranged inside at least one balancing cavity, the balancing material being solid at an operating temperature of the X-ray tube and liquid at a higher temperature higher than the operating temperature, such that the balancing material becomes liquid;
   dislocating at least a part of the balancing material inside the balancing cavity such that the imbalance of the rotary anode is at least partially compensated; and
   cooling the balancing material, such that the balancing material becomes solid.

* * * * *